United States Patent [19]

Horvat et al.

[11] Patent Number: 5,169,439
[45] Date of Patent: Dec. 8, 1992

[54] MARKING FLUID

[75] Inventors: Ivan Horvat, Weissenburg; Peter Kramp, Nürnberg; Erhard Onczul, Forchheim, all of Fed. Rep. of Germany

[73] Assignee: Schwan-Stabilo Schwanhausser GmbH & Co., Nuremberg, Fed. Rep. of Germany

[21] Appl. No.: 669,613

[22] Filed: Mar. 14, 1991

[30] Foreign Application Priority Data

Jun. 30, 1990 [DE] Fed. Rep. of Germany ....... 4020901

[51] Int. Cl.$^5$ .............................................. C09D 11/14
[52] U.S. Cl. .................................. 106/25 R; 106/22 F
[58] Field of Search ..................................... 106/22-25

[56] References Cited

U.S. PATENT DOCUMENTS

| 47,909 | 5/1865 | Hulot | 106/25 |
|---|---|---|---|
| 461,082 | 11/1949 | Biro | 106/25 |
| 1,932,248 | 2/1931 | Miner | 106/25 |
| 2,868,741 | 1/1959 | Chambers | 106/25 |
| 3,073,707 | 1/1963 | Clark | 106/22 |
| 3,464,936 | 8/1965 | Mathelin | 106/25 |
| 4,242,139 | 12/1980 | Tröster | 106/22 |

FOREIGN PATENT DOCUMENTS 2441823 8/1974 Fed. Rep. of Germany .

*Primary Examiner*—Shrive Beck
*Assistant Examiner*—Margaret Einsmann
*Attorney, Agent, or Firm*—Bachman & LaPointe

[57] ABSTRACT

A marking fluid based on an aqueous solution of hydroxyprene trisulfonic acid as a fluorescence dyestuff and having a pH-value in the alkaline range. The marking fluid further includes at least one mono, oligo or polysaccharide, or a polyol derived therefrom by reduction, or a mixture thereof, to improve the properties of the fluid in a number of respects. The marking fluid can be used on a wide range of different surfaces and affords improved fastness in relation to light.

25 Claims, No Drawings

MARKING FLUID

BACKGROUND OF THE INVENTION

The present invention generally concerns a marking fluid containing hydroxypyrene trisulfonic acid as a fluorescence dyestuff or daylight fluorescing dye, in an aqueous alkaline medium. Hydroxypyrene trisulfonic acid is also referred to as pyranine or C.I. solvent green 7 No 59040, and that usage may be adopted herein.

A marking fluid of that kind is described in German patent specification No 2 315 680 and it can be used for clearly emphasising written, typed or printed tests or the like by being applied thereover, or to provide visual contrast for text from other pieces of text, thereby providing a marking or highlighting effect. The marking fluid described in the above-mentioned German patent has the advantage over other marking fluids that the marking or highlighting effect which is produced thereby on a document is highly color-intensive due to the daylight fluorescing dye character of the pyranine used and the coloration effect occurs spontaneously after application.

However certain disadvantages occur in some uses of the above-mentioned known marking fluids. If the pyranine-bearing fluid is applied for example to the copies of certain kinds of sets of copy paper which are referred to as 'carbon paper-free' or 'self-carboning', it can be observed that the script or text to be marked is caused to fade or even completely erased while if the marking fluid is applied to heat-sensitive paper, for example what is known as 'fax paper', that can result in a darkening effect in regard to the marking area. Undesirable effects of that kind which are linked to the text to be emphasised or highlighted with the marking fluid becoming illegible may also occur in relation to papers with other coatings thereon.

In an endeavor to improve the fastness in relation to light of fluorescence dyestuffs acting as daylight fluorescing dyes, including those which contain pyranine, it is proposed in German patent specification No. 2 441 823 that reducing means should be added to the dyestuffs or the marking fluids containing same. Admittedly that may improve the fastness to light to a certain extent but the above-mentioned disadvantages involving fading or erasure of the text and a blackening or darking effect in regard to the marking area are not only not eliminated but under some circumstances and depending on the respective type of paper involved may even be worsened.

SUMMARY OF THE INVENTION

An object of the present invention is to provide a pyranine-bearing marking fluid which affords greater versatility of use.

Another object of the present invention is to provide a pyranine-bearing marking fluid which can be used on a wide range of different surfaces without suffering from disadvantages as referred to above and while at the same time also affording improved fastness in relation to light.

Still another object of the present invention is to provide a marking fluid which is more environment-friendly while also being more cost-viable.

To attain those and other objects the present invention provides a marking fluid based on an aqueous solution with a pH-value in the alkaline range, of hydroxypyrene trisulfonic acid (pyranine or C.I. solvent green 7 No 59040), which includes a content of mono, oligo or polysaccharides, the polyols derived therefrom by reduction, or mixtures of said substances.

The marking fluid in accordance with the present invention can be used in a wider range of situations so that it enjoys greater versatility of use. That versatility of use of the marking fluid according to the invention means for example that there is no longer any need to prepare a plurality of marking fluids of different compositions for use on different surfaces and materials, thereby at least reducing the possibility of confusion and mistake on the part of the user when using the marking fluid for marking or highlighting purposes. Furthermore, the versatility of the marking fluid according to the invention means that stockkeeping on the part of traders handling the marking fluid can be rationalized to a greater degree. The marking fluid also has cost advantages over the use of pigment-bearing marking fluids based on colored plastic dispersions. Furthermore the high proportion of reprocessable raw materials used in the marking fluid according to the invention is environment-friendly by virtue of reducing the demand on natural resources such as crude oil.

For the purposes of the present invention, for reasons of cost, it may be preferable to use the naturally occurring forms of the above-mentioned saccharides. The content thereof in the marking fluid may be between 5 and 50% by weight, preferably between 10 and 20% by weight, with respect to the total weight of the fluid.

The following may be mentioned as examples of the monosaccharides which can be considered in accordance with the invention: pentoses, for example xylose; aldohexoses, for example glucose, mannose, and galactose; ketohexoses, for example fructose and sorbose.

Examples of disaccharides which can be used in accordance with the invention are saccharose, lactose, maltose, trehalose, and cellobiose.

An example of a trisaccharide which can be used in accordance with the invention is raffinose.

Among the polysaccharides, the following have been found to be appropriate: maize, rice, wheat or potato starch.

It will be appreciated that mixtures of the above-mentioned saccharides can also be used.

In order to provide for the desired color effect the fluid may also contain one or more other dyestuffs, preferably fluorescing dyestuffs, which should be water-soluble.

In accordance with a further preferred feature of the invention, setting a pH-value in the range of from 8 to 13 promotes the fluorescence effect, with the pH-value even more preferably being in the narrower range of between 9 and 10. A buffering effect specifically with trishydroxymethylaminomethane has proven to be advantageous, but it would certainly also be possible to use further buffering substances such as for example sodium citrate.

So that the stability and durability of the marking fluid according to the invention is not adversely affected by microbial action and attack, a preserving agent may also be added thereto, for example an isothiazolinone derivative.

In accordance with further features of the invention, other additives for improving or modifying the properties of the marking fluid, for example flow characteristics and behaviour and an increase in brilliance, are surface-active substances or wetting agents and/or water-soluble binding agents, for example oil-free alkyd resins.

Set out below are the compositions of some Examples of the marking fluid in accordance with the principles of the present invention.

| Example 1: YELLOW effect | |
|---|---|
| Pyranine (solvent green 7) | 1.6% |
| Trishydroxymethylaminomethane | 1.0% |
| NaOH | 0.7% |
| Isothiazolinone derivative | 0.2% |
| Glucose | 20.0% |
| Water | 76.5% |
| Example 2: GREEN effect | |
| Pyranine | 1.6% |
| Reactive Green 21 | 0.35% |
| Trishydroxymethylaminomethane | 1.0% |
| NaOH | 0.7% |
| Isothiazolinone derivative | 0.25% |
| Saccharose | 20.00% |
| Water | 76.1% |
| Example 3: ORANGE effect | |
| Pyranine | 0.8% |
| Basic red 1 (10% solution) | 0.5% |
| Basic violet 10 (10% solution) | 0.25% |
| Trishydroxymethylaminomethane | 0.5% |
| Sodium citrate | 4.5% |
| $Na_2CO_3$ | 3.5% |
| Oil-free alkyd resin | 13.0% |
| Fructose | 10.0% |
| Isothiazolinone derivative | 0.1% |
| Water | 66.85% |
| Example 4: ORANGE effect | |
| Pyranine | 0.8% |
| Basic red 1 (10% solution) | 0.5% |
| Basic violet 10 (10% solution) | 0.25% |
| Trishydroxymethylaminomethane | 0.5% |
| Sodium citrate | 4.55% |
| $Na_2CO_3$ | 3.5% |
| Oil-free alkyd resin | 13.0% |
| Galactose | 10.0% |
| Isothiazolinone derivative | 0.1% |
| Water | 66.8% |
| Example 5: YELLOW effect | |
| Pyranine | 1.7% |
| Trishydroxymethylaminomethane | 1.0% |
| NaOH | 0.8% |
| Isothiazolinone derivative | 0.2% |
| Lactose | 20.0% |
| Water | 76.5% |
| Example 6: YELLOW effect | |
| Pyranine | 1.8% |
| Trishydroxymethylaminomethane | 1.0% |
| $Na_2CO_3$ | 2.0% |
| Isothiazolinone derivative | 0.2% |
| Maltose | 20.0% |
| Water | 75.0% |
| Sec. Na-alkane sulfonate | 1.0% |
| Example 7: YELLOW effect | |
| Pyranine | 1.9% |
| Trishydroxymethylaminomethane | 1.5% |
| $Na_2CO_3$ | 1.1% |
| Isothiazolinone derivative | 0.2% |
| Saccharose | 10.0% |
| Fructose | 5.0% |
| Sorbitol | 5.0% |
| Water | 75.3% |
| Example 8: GREEN effect | |
| Pyranine | 1.4% |
| Reactive green 21 | 0.4% |
| Trishydroxymethylaminomethane | 1.0% |
| NaOH | 1.4% |
| Lactose | 10.0% |
| Fructose | 10.0% |
| Isothiazolinone derivative | 0.2% |
| Water | 75.6% |
| Example 9: YELLOW effect | |
| Pyranine | 1.8% |
| Trishydroxymethylaminomethane | 1.0% |
| $Na_2CO_3$ | 1.0% |

| -continued | |
|---|---|
| Maltose | 10.0% |
| Galactose | 10.0% |
| Isothiazolinone derivative | 0.2% |
| Water | 76.0% |
| Example 10: YELLOW effect | |
| Pyranine | 1.9% |
| Trishydroxymethylaminomethane | 1.0% |
| NaOH | 1.0% |
| Isothiazolinone derivative | 0.2% |
| Xylose | 20.0% |
| Water | 75.9% |
| Example 11: YELLOW effect | |
| Pyranine | 1.7% |
| Trishydroxymethylaminomethane | 1.1% |
| $Na_2CO_3$ | 1.2% |
| Isothiazolinone derivative | 0.2% |
| Xylose | 10.0% |
| Glucose | 10.0% |
| Water | 75.8% |
| Example 12: ORANGE effect | |
| Pyranine | 0.7% |
| Basic red 1 (10% solution) | 0.6% |
| Basic violet 10 (10% solution) | 0.2% |
| Trishydroxymethylaminomethane | 0.7% |
| $Na_2CO_3$ | 3.5% |
| Isothiazolinone derivative | 0.4% |
| Raffinose | 15.0% |
| Oil-free alkyd resin | 13.0% |
| Water | 65.9% |
| Example 13: YELLOW effect | |
| Pyranine | 1.8% |
| Trishydroxymethylaminomethane | 1.2% |
| NaOH | 1.4% |
| Isothiazolinone derivative | 0.3% |
| Wheat starch | 10.0% |
| Water | 85.03% |
| Example 14: GREEN effect | |
| Pyranine | 1.6% |
| Reactive green 21 | 0.4% |
| Trishydroxymethylaminomethane | 1.1% |
| $Na_2CO_3$ | 0.9% |
| Isothiazolinone derivative | 0.3% |
| Cellobiose | 10.0% |
| Sorbitol | 10.0% |
| Water | 75.7% |

It will be appreciated that the foregoing examples have been set forth solely by way of illustration of the present invention and that various modifications and alterations may be made therein without thereby departing from the spirit and scope of the present invention.

We claim:

1. A marking fluid based on an aqueous solution of hydroxypyrene trisulfonic acid as a fluorescence dyestuff (C.I. Solvent Green 7 No. 59040), which has a pH-value in the alkaline range, and including at least one substance selected from the group consisting of mono, oligo and polysaccharides, polyols derived therefrom by reduction, and mixtures of said substances in an amount of approximately 5 to 50% by weight, wherein said marking fluid can be used on a wide range of different surfaces and affords improved fastness in relation to light.

2. A marking fluid as set forth in claim 1 wherein the at least one substance is at least one saccharide which corresponds to a naturally occurring form of saccharide.

3. A marking fluid as set forth in claim 1 wherein the content of the at least one saccharide in the marking fluid is approximately between 10 and 20% by weight with respect to the total weight of the fluid.

4. A marking fluid as set forth in claim 1 wherein said at least one substance includes at least one pentose.

5. A marking fluid as set forth in claim 4 wherein the at least one pentose is a xylose.

6. A marking fluid as set forth in claim 1 wherein said at least one substance includes at least one aldohexose.

7. A marking fluid as set forth in claim 6 wherein the at least one aldohexose is selected from glucose, mannose and galactose.

8. A marking fluid as set forth in claim 1 wherein said at least one substance includes at least one ketohexose.

9. A marking fluid as set forth in claim 8 wherein the at least one ketohexose is selected from fructose and sorbose.

10. A marking fluid as set forth in claim 1 wherein said at least one substance includes at least one disaccharide.

11. A marking fluid as set forth in claim 10 wherein the at least one disaccharide is selected from saccharose, lactose, maltose, trehalose and cellobiose.

12. A marking fluid as set forth in claim 1 wherein said at least one substance includes at least one trisaccharide.

13. A marking fluid as set forth in claim 12 wherein the at least one trisaccharide is a raffinose.

14. A marking fluid as set forth in claim 1 wherein said at least one substance includes at least one polysaccharide.

15. A marking fluid as set forth in claim 14 wherein the at least one polysaccharide is derived from maize, rice, wheat or potato starch.

16. A marking fluid as set forth in claim 1 and including at least one further water-soluble dyestuff.

17. A marking fluid as set forth in claim 16 wherein the further water soluble dyestuff is fluorescing.

18. A marking fluid as set forth in claim 17 wherein the further water soluble dyestuff is a daylight fluorescing dyestuff.

19. A marking fluid as set forth in claim 1 wherein the fluid is buffered to a pH-value in the range between about 8 and 13.

20. A marking fluid as set forth in claim 19 wherein buffering is effected to a pH-value of between about 9 and 10.

21. A marking fluid as set forth in claim 19 and including trishydroxymethylaminomethane.

22. A marking fluid as set forth in claim 1 wherein the fluid further includes a preserving agent to protect it from microbial action.

23. A marking fluid as set forth in claim 22 and containing an isothiazolinone derivative.

24. A marking fluid as set forth in claim 1 and including a water-soluble binding agent.

25. A marking fluid as set forth in claim 1 and including a wetting agent.

* * * * *